(12) United States Patent
Grant et al.

(10) Patent No.: US 9,373,334 B2
(45) Date of Patent: Jun. 21, 2016

(54) METHOD AND SYSTEM FOR GENERATING AN AUDIO METADATA QUALITY SCORE

(71) Applicant: DOLBY LABORATORIES LICENSING CORPORATION, San Francisco, CA (US)

(72) Inventors: Michael John Grant, San Francisco, CA (US); Michael Donald Hoffmann, Pacifica, CA (US); Sachin Nanda, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/355,653

(22) PCT Filed: Nov. 15, 2012

(86) PCT No.: PCT/US2012/065217
§ 371 (c)(1),
(2) Date: May 1, 2014

(87) PCT Pub. No.: WO2013/078056
PCT Pub. Date: May 30, 2013

(65) Prior Publication Data
US 2014/0288940 A1  Sep. 25, 2014

Related U.S. Application Data

(60) Provisional application No. 61/562,487, filed on Nov. 22, 2011.

(51) Int. Cl.
*G10L 19/008* (2013.01)
*G10L 19/16* (2013.01)
(Continued)

(52) U.S. Cl.
CPC .............. *G10L 19/008* (2013.01); *G10L 19/167* (2013.01); *G10L 25/60* (2013.01); *H04H 60/73* (2013.01); *H04N 21/439* (2013.01); *H04N 21/84* (2013.01)

(58) Field of Classification Search
CPC ...... G10L 19/008; G10L 19/167; G10L 25/60; H04H 60/73; H04H 21/84; H04H 21/439
USPC ........................................................ 704/500
See application file for complete search history.

(56) References Cited

U.S. PATENT DOCUMENTS 5,583,962 A   12/1996   Todd
5,632,005 A    5/1997   Davis
(Continued)

FOREIGN PATENT DOCUMENTS

WO      2010/115298      10/2010

OTHER PUBLICATIONS

Carroll T. "Audio Metadata: You can get there from here" Internet Citation, Oct. 11, 2004.

(Continued)

*Primary Examiner* — Tammy Pham
*Assistant Examiner* — Edwin S Leland, III

(57) ABSTRACT

A method including the steps of assessing at least two metadata parameters associated with an audio bitstream (e.g., an encoded Dolby Digital (AC-3), Dolby Digital Plus, or Dolby E bitstream), determining individual metadata parameter quality values, each of the individual metadata parameter quality values indicative of quality (e.g., correctness) of a different one of the at least two metadata parameters, and generating data indicative of a metadata score, where the metadata score is a value determined by a combination (e.g., a linear combination or other weighted combination) of the individual metadata parameter quality values. The metadata score is indicative of overall quality (e.g., correctness) of the at least two metadata parameters. Another aspect is a system (e.g., a test device or measurement device, or another test or measurement product, or a processor) configured (e.g., programmed) to perform any embodiment of the method.

15 Claims, 1 Drawing Sheet

(51) Int. Cl.
  *H04H 60/73* (2008.01)
  *H04N 21/84* (2011.01)
  *G10L 25/60* (2013.01)
  *H04N 21/439* (2011.01)

(56) References Cited

U.S. PATENT DOCUMENTS

| | | | |
|---|---|---|---|
| 5,633,981 A | 5/1997 | Davis | |
| 5,727,119 A | 3/1998 | Davidson | |
| 6,021,386 A | 2/2000 | Todd | |
| 7,454,331 B2 | 11/2008 | Vinton | |
| 7,617,109 B2 | 11/2009 | Smithers | |
| 8,032,385 B2 | 10/2011 | Smithers | |
| 8,379,880 B2* | 2/2013 | Riedl | H03G 7/007 381/107 |
| 2004/0167896 A1* | 8/2004 | Eakin | G06F 17/30873 |
| 2004/0167905 A1* | 8/2004 | Eakin | G06F 17/30893 |
| 2004/0187111 A1* | 9/2004 | Eakin | G06F 17/30893 718/100 |
| 2005/0033777 A1* | 2/2005 | Moraes | G06F 17/30575 |
| 2005/0216815 A1* | 9/2005 | Novotny | H04N 19/46 714/758 |
| 2005/0244011 A1 | 11/2005 | Kim | |
| 2006/0002572 A1* | 1/2006 | Smithers | H03G 9/005 381/104 |
| 2007/0106646 A1* | 5/2007 | Stern | G06F 17/30796 |
| 2008/0198922 A1 | 8/2008 | Rhie | |
| 2009/0063159 A1* | 3/2009 | Crockett | G10L 19/167 704/500 |
| 2010/0189290 A1 | 7/2010 | Choi | |
| 2010/0241258 A1 | 9/2010 | Medina | |
| 2010/0250599 A1* | 9/2010 | Schmidt | G06F 17/30241 707/780 |
| 2011/0018998 A1* | 1/2011 | Guzik | H04N 21/21 348/143 |
| 2011/0039506 A1* | 2/2011 | Lindahl | G10L 19/20 455/130 |
| 2011/0164855 A1* | 7/2011 | Crockett | H04N 5/91 386/230 |
| 2012/0046956 A1* | 2/2012 | Stewart | G11B 27/105 704/500 |
| 2014/0294200 A1* | 10/2014 | Baumgarte | H03G 3/20 381/107 |
| 2015/0325243 A1* | 11/2015 | Grant | G10L 19/002 704/229 |

OTHER PUBLICATIONS

ATSC Standard A52/A: "Digital Audio Compression Standard (AC-3), Revision A" Advanced Television Systems Committe, Aug. 20, 2001.

Todd, C. et al "Flexible Perceptual Coding for Audio Transmission and Storage" 96th Convention of the Audio Engineering Society, Feb. 26, 1994.

Vernon, Steve "Design and Implementation of AC-3 Coders" IEEE Trans. Consumer Electronics, vol. 41, No. 3, Aug. 1995.

Davis, Mark "The AC-3 Multichannel Coder" Audio Engineering Society Preprint 3774, 95th AES Convention, Oct. 1993.

Bosi, M. et al "High Quality, Low-Rate Audio Transform Coding for Transmission and Multimedia Applications" Audio Engineering Society Preprint 3365, 93rd AES Convention, Oct. 1992.

Fielder, L et al "Introduction to Dolby Digital Plus, an Enhancement to the DOlby Digital Coding System" AES Convention Paper, 117th AES Convention, Oct. 28, 2004.

Truman, M, et al "Efficient Bit Allocation, Quantization, and Coding in an Audio Distribution System" AES Convention 107, Sep. 1, 1999.

Fielder, L. et al "Professional Audio Coder Optimized for Use with Video" AES Preprint, 5033, 107th AES Conference, Sep. 1, 1999.

ISO/IEC 13818-7:1997 "Information Technology—Generic Coding of Moving Pictures and Associated Audio Information" Part 7: Advanced Audo Coding, International Standards Organization, Apr. 1997.

Brandenburg, Karlheinz, "MP3 and AAC Explained" AES 17th International Conference: High-Quality Audio Coding, Aug. 1999.

Bosi, M. et al "ISO/IEC MPEG-2 Advanced Audio Coding" AES preprint 4382, 101st AES Convention, Nov. 1, 1996.

ITU-R Recommendation ITU-R BS.1770-3 "Algorithms to Measure Audio Programme Loudness and True-Peak Audio Level" Aug. 2012.

\* cited by examiner

US 9,373,334 B2

METHOD AND SYSTEM FOR GENERATING AN AUDIO METADATA QUALITY SCORE

CROSS-REFERENCE TO RELATED APPLICATIONS

This application claims priority to U.S. Provisional Application No. 61/562,487, filed Nov. 22, 2011, which is hereby incorporated by reference in its entirety.

BACKGROUND OF THE INVENTION

1. Field of the Invention

The invention pertains to audio signal processing, and more particularly, to assessment of metadata associated with audio data bitstreams. Some embodiments of the invention are useful for assessing metadata associated with audio data that have been encoded in accordance with one of the formats known as Dolby Digital (AC-3), Dolby Digital Plus, and Dolby E, or another encoding format (e.g., MPEG-4 AAC). Dolby, Dolby Digital, Dolby Digital Plus and Dolby E are trademarks of Dolby Laboratories Licensing Corporation.

2. Background of the Invention

A typical stream of audio data (e.g., an AC-3 bitstream) includes both audio content (e.g., one or more channels of audio content) and metadata indicative of at least one characteristic of the audio content.

US Patent Application Publication No. US 2009/0063159 A1, by Brett G. Crockett, assigned to the assignee of the present invention and published on Mar. 5, 2009 ("Crockett"), describes methods and systems for verifying and correcting metadata associated with AC-3 bitstreams and other audio data streams. Crockett describes methods for determining whether the "DIALNORM" metadata parameter of an AC-3 bitstream is correct, including (in an output AC-3 bitstream) verification information indicative of whether the DIALNORM parameter is correct, and (if the DIALNORM parameter is not correct) including in the output AC-3 bitstream a corrected version of the DIALNORM parameter and optionally also corrected versions of related metadata parameters (corrected versions of the COMPR and DYNRNG parameters). The disclosure of Crockett (US Patent Application Publication No. US 2009/0063159 A1) in its entirety is hereby incorporated by reference into the present disclosure.

The metadata verification and correction methods described in Crockett are intended to be implemented in a processor (e.g., a decoder) with an aim to detect incorrect metadata in an input audio stream and to correct (within the processor) incorrect metadata so that the audio can be played back using the corrected metadata as intended by the content creator. The methods would thus be performed in a manner hidden from the user. The user would not know whether the metadata in the input audio stream was determined to be correct or incorrect. In contrast, the present invention (which would typically be implemented in test or measurement products) assesses metadata associated with an audio bitstream to generate output (e.g., a single number, referred to as a "metadata score") indicative of metadata quality, in order to inform a user (e.g., a broadcaster) of the quality of the metadata. The output generated in accordance with the invention would typically be used to identify and fix metadata issues in systems (e.g., broadcast systems) employed to generate and/or disseminate the bitstream.

In typical implementations in test or measurement products, embodiments of the invention provide output (e.g., data indicative of a single number) indicative of the quality (e.g., correctness) of multiple metadata parameters included in an audio bitstream (e.g., an encoded audio bitstream that has been or is to be broadcast or otherwise disseminated), and optionally also output indicative of detailed information about the quality of each of two or more metadata parameters of the bitstream. The output is useful to enable or assist a user (e.g., a broadcaster) to diagnose where problems occur within a system which generates and/or disseminates the bitstream (e.g., a broadcast chain).

Although the invention is not limited to use with AC-3 encoded audio, for convenience it will be described in embodiments in which it assesses metadata of an AC-3 encoded audio bitstream. An AC-3 encoded bitstream comprises metadata and one to six channels of audio content. The audio content is audio data that has been compressed using perceptual audio coding. The metadata includes several audio metadata parameters (described below) that are intended for use in changing the sound of a program delivered to a listening environment.

Details of AC-3 (also known as Dolby Digital) coding are well known and are set forth many published references including the following:

ATSC Standard A52/A: Digital Audio Compression Standard (AC-3), Revision A, Advanced Television Systems Committee, 20 Aug. 2001;

Flexible Perceptual Coding for Audio Transmission and Storage," by Craig C. Todd, et al, $96^{th}$ Convention of the Audio Engineering Society, Feb. 26, 1994, Preprint 3796;

"Design and Implementation of AC-3 Coders," by Steve Vernon, IEEE Trans. Consumer Electronics, Vol. 41, No. 3, August 1995;

"The AC-3 Multichannel Coder" by Mark Davis, Audio Engineering Society Preprint 3774, 95th AES Convention, October, 1993;

"High Quality, Low-Rate Audio Transform Coding for Transmission and Multimedia Applications," by Bosi et al, Audio Engineering Society Preprint 3365, 93rd AES Convention, October, 1992; and U.S. Pat. Nos. 5,583,962; 5,632,005; 5,633,981; 5,727,119; and 6,021,386.

Details of Dolby Digital Plus coding are set forth in "Introduction to Dolby Digital Plus, an Enhancement to the Dolby Digital Coding System," AES Convention Paper 6196, $117^{th}$ AES Convention, Oct. 28, 2004.

Details of Dolby E coding are set forth in "Efficient Bit Allocation, Quantization, and Coding in an Audio Distribution System", AES Preprint 5068, 107th AES Conference, August 1999 and "Professional Audio Coder Optimized for Use with Video", AES Preprint 5033, 107th AES Conference August 1999.

Details of MPEG-2 AAC coding are also well known and are set forth in ISO/IEC 13818-7:1997(E) "Information technology—Generic coding of moving pictures and associated audio information —, Part 7: Advanced Audio Coding (AAC)," International Standards Organization (April 1997); "MP3 and AAC Explained" by Karlheinz Brandenburg, AES 17th International Conference on High Quality Audio Coding, August 1999; and "ISO/IEC MPEG-2 Advanced Audio Coding" by Bosi, et. al., AES preprint 4382, 101st AES Convention, October 1996.

Each frame of an AC-3 encoded audio bitstream contains audio content and metadata for 1536 samples of digital audio. For a sampling rate of 48 kHz, this represents 32 milliseconds of digital audio or a rate of 31.25 frames per second of audio.

Each AC-3 frame is divided into sections, including: a Synchronization Information (SI) section which contains a synchronization word (SW) and the first of two error correction words (CRC1); a Bitstream Information (BSI) section which contains most of the metadata; six Audio Blocks (AB0 to AB5) which contain data compressed audio content (and can contain metadata); waste bits (W) which contain any unused bits left over after the audio content is compressed; an Auxiliary (AUX) information section which contains more metadata; and the second of two error correction words (CRC2). AC-3 frames and the sections of an AC-3 frame are described in more detail below.

In an AC-3 bitstream there are several audio metadata parameters that are specifically intended for use in changing the sound of the program delivered to a listening environment. Three of the metadata parameters relate to playback signal level and dynamic range: DIALNORM, COMPR and DYNRNG.

The DIALNORM parameter is intended to indicate the mean level of dialog occurring an audio program, and is used to determine audio playback signal level. During playback of a bitstream comprising a sequence of different audio program segments (each having a different DIALNORM parameter), an AC-3 decoder uses the DIALNORM parameter of each segment to modify the playback level or loudness of such that the perceived loudness of the dialog of the sequence of segments is at a consistent level. Each encoded audio segment (item) in a sequence of encoded audio items would (in general) have a different DIALNORM parameter, and the decoder would scale the level of each of the items such that the playback level or loudness of the dialog for each item is the same or very similar, although this might require application of different amounts of gain to different ones of the items during playback.

The COMPR and DYNRNG parameters (sometimes referred to hereinafter as "dynamic range compression" or "dynamic range control" parameters) are used to determine dynamic range of the audio playback signal. One or neither, but not both, of the COMPR and DYNRNG parameters is used in decoding, depending on a decoding mode.

DIALNORM typically is set by a user, and is not generated automatically, although there is a default DIALNORM value if no value is set by the user. For example, a content creator may make loudness measurements with a device external to an AC-3 encoder and then transfer the result (indicative of the loudness of the spoken dialog of an audio program) to the encoder to set the DIALNORM value. Thus, there is reliance on the content creator to set the DIALNORM parameter correctly. The COMPR and DYNRNG parameters, although related to the DIALNORM parameter, are typically calculated automatically during encoding in response to a user-set DIALNORM parameter value and one of a number of dynamic range compression profiles (or no profile, which results in application of DIALNORM but allows reproduction of the full dynamic range).

Other metadata parameters of an AC-3 bitstream include "downmixing" parameters (CLEV, CMIXLEV, SLEV, SUR-MIXLEV, MIXLEVEL and MIXLEVEL2) and parameters indicative of the number of audio channels of the bitstream (e.g., ACMOD and BSMOD). The downmixing metadata provides instructions to a decoder for downmixing an original 5.1 channels of audio content to a fewer number of reproduction channels.

The DIALNORM parameter allows for uniform reproduction of spoken dialog when decoding an AC-3 bitstream, e.g., to maintain a uniform subjective level of spoken dialog in the reproduced sound perceived by a listener. The reproduction system gain becomes a function of both the listener's desired reproduction sound pressure level for dialog, and the DIALNORM value. An AC-3 decoder typically employs the DIALNORM value in the digital domain within the decoder to scale gain, which results in adjustment of the playback gain.

There are several different reasons why the DIALNORM parameter in an AC-3 bitstream may be incorrect. First, each AC-3 encoder has a default DIALNORM value that is used during the generation of the bitstream if a DIALNORM value is not set by the content creator. This default value, commonly chosen as −27 dB, may be substantially different than the actual dialog loudness level of the audio. Second, even if a content creator measures loudness and sets the DIALNORM value accordingly, a loudness measurement algorithm or meter may have been used that does not conform to the recommended AC-3 loudness measurement method, resulting in an incorrect DIALNORM value. Third, even if an AC-3 bitstream has been created with the DIALNORM value measured and set correctly by the content creator, it may have been changed to an incorrect value during transmission and/or storage of the bitstream. For example, it is not uncommon in television broadcast applications for AC-3 bitstreams to be decoded, modified and then re-encoded using incorrect DIALNORM metadata information. Thus, a DIALNORM value included in an AC-3 bitstream may be incorrect or inaccurate and therefore may have a negative impact on the quality of the listening experience.

There is a need for a way to assess the quality of multiple parameters (e.g., the DIALNORM value and at least one other metadata parameter) in an AC-3 bitstream (e.g., to assess whether they have been set correctly, and have not changed during distribution and transmission) and provide output indicative of the metadata quality (e.g., output useful by broadcasters or other users to identify and fix metadata issues in their systems). More generally, there is a need for a way to assess whether multiple metadata parameters in an audio bitstream are correct (e.g., have been set correctly by a content creator or generated correctly during encoding, and have not changed during distribution and transmission) and provide output indicative of the quality of the metadata parameters (e.g., output useful by broadcasters or other users to identify and fix metadata issues in systems which generate or disseminate such a bitstream).

BRIEF DESCRIPTION OF THE INVENTION

In a class of embodiments, the invention is a method including the steps of: (a) assessing at least two metadata parameters associated with an audio bitstream (e.g., an encoded audio bitstream); and (b) determining individual metadata parameter quality values, each of the individual metadata parameter quality values indicative of quality (e.g., correctness) of a different one of the at least two metadata parameters, and generating data indicative of a metadata score, where the metadata score is a value determined by a combination (e.g., a linear combination or other weighted combination) of the individual metadata parameter quality values, and said metadata score is indicative of overall quality (e.g., correctness) of the at least two metadata parameters. Typically, the metadata parameters are included in an audio bitstream (e.g., an encoded audio bitstream) which also includes audio data, and step (a) includes a step of assessing the audio data and the at least two metadata parameters of the audio bitstream. In some embodiments, step (a) includes a step of assessing a complete set of (i.e., all of the) metadata parameters associated with an audio bitstream, the individual metadata parameter quality values determined in step (b) are indicative of quality of each of the metadata parameters in the complete set, and the metadata score is a number determined by (and indicative of) a weighted sum (or other combination)

of the individual metadata parameter quality values. Each of the latter embodiments measures quality of the complete set of metadata parameters and produces a single number (metadata score) that represents overall quality of the complete set of metadata parameters.

In a class of embodiments, a system (e.g., a test device or measurement device, or another test or measurement product, or a processor) configured (e.g., programmed) to perform the inventive method is configured to generate (and to assert as output) at least one signal indicative of each determined metadata score (each metadata score being a single number which is a combination (e.g., weighted combination) of individual metadata parameter quality values). Optionally, the system is configured to output at least one signal indicative of individual metadata parameter quality values determined during performance of the method. The output of such a system would be useful to inform users (e.g., broadcasters) of the quality of metadata associated with audio bitstreams, and thus to aid the users in identifying and fixing metadata issues in their systems (e.g., broadcast systems) which generate and/or disseminate the bitstreams. Typically, the metadata score is indicative of the quality (e.g., correctness) of multiple metadata parameters included in an audio bitstream (e.g., an encoded audio bitstream that has been or is to be broadcast or otherwise disseminated), and the system's output is optionally also indicative of more detailed information (e.g., individual metadata parameter quality values) regarding the quality (e.g., correctness) of each of two or more metadata parameters of the bitstream.

Typical embodiments of the invention provide a metric for the quality of multiple metadata parameters (e.g., a complete set of metadata) in an audio bitstream at any stage in a broadcast chain (or other system for generating and disseminating the bitstream). A broadcaster (e.g., an operator of a parent broadcast network) could use the metadata score (and optionally also the individual metadata parameter quality values) determined in accordance with the invention to diagnose metadata issues in systems which generate and disseminate the bitstream. For example, the broadcaster could be notified when the metadata score falls below a predetermined acceptable quality threshold level.

In some implementations of the inventive method, the audio bitstream assessed in step (a) is a Dolby Digital (AC-3) encoded bitstream including a DIALNORM metadata parameter, dynamic range control metadata parameters, and other metadata parameters, and the metadata score is indicative of quality of the DIALNORM parameter and at least one other metadata parameter (e.g., the ACMOD parameter) of the bitstream. Alternatively, the metadata score is indicative of quality of the some other combination of the metadata parameters (e.g., the ACMOD metadata parameter and/or at least one downmixing metadata parameter). In some other implementations of the method, the audio bitstream assessed in step (a) is an encoded bitstream of another type, e.g., a Dolby E encoded bitstream or an MPEG-4 AAC encoded bitstream.

Audio bitstreams other than AC-3 encoded bitstreams, e.g., audio bitstreams that have been encoded in one of the Dolby Digital Plus or Dolby E formats, can include the metadata parameters of an AC-3 encoded bitstream (including those specifically mentioned herein: DIALNORM, COMPR, DYNRNG, CLEV, CMIXLEV, SLEV, SURMIXLEV, MIXLEVEL and MIXLEVEL2, ACMOD, and BSMOD). In some embodiments of the inventive method, the audio bitstream assessed in step (a) is such a bitstream, and the determined metadata score is indicative of overall quality of at least two (e.g., all) of such metadata parameters. Other audio bitstreams include sets of metadata parameters different than the set of metadata parameters included in an AC-3, Dolby Digital Plus, or Dolby E bitstream. In some embodiments of the inventive method, the audio bitstream assessed in step (a) is such a bitstream. The invention is not limited to methods and systems for assessing any specific set of metadata parameters associated with audio data (and generating data indicative of a metadata score for the assessed metadata parameters), or for assessing metadata parameters associated with audio data having any specific format (and generating data indicative of a metadata score for the assessed metadata parameters).

By performing the metadata assessment repeatedly to assess a sequence of combinations of metadata parameter values of an audio bitstream (e.g., in real-time, continuously), some embodiments of the method determine a sequence of different metadata scores for the audio bitstream.

Aspects of the invention include a system or device configured (e.g., programmed) to perform any embodiment of the inventive method, and a computer readable medium (e.g., a disc) which stores code for implementing any embodiment of the inventive method or steps thereof. For example, the inventive system can be or include a programmable general purpose processor, digital signal processor, or microprocessor, programmed with software or firmware and/or otherwise configured to perform any of a variety of operations on data, including an embodiment of the inventive method or steps thereof. Such a general purpose processor may be or include a computer system including an input device, a memory, and processing circuitry programmed (and/or otherwise configured) to perform an embodiment of the inventive method (or steps thereof) in response to data asserted thereto.

DETAILED DESCRIPTION OF EMBODIMENTS OF THE INVENTION

Figure 1:
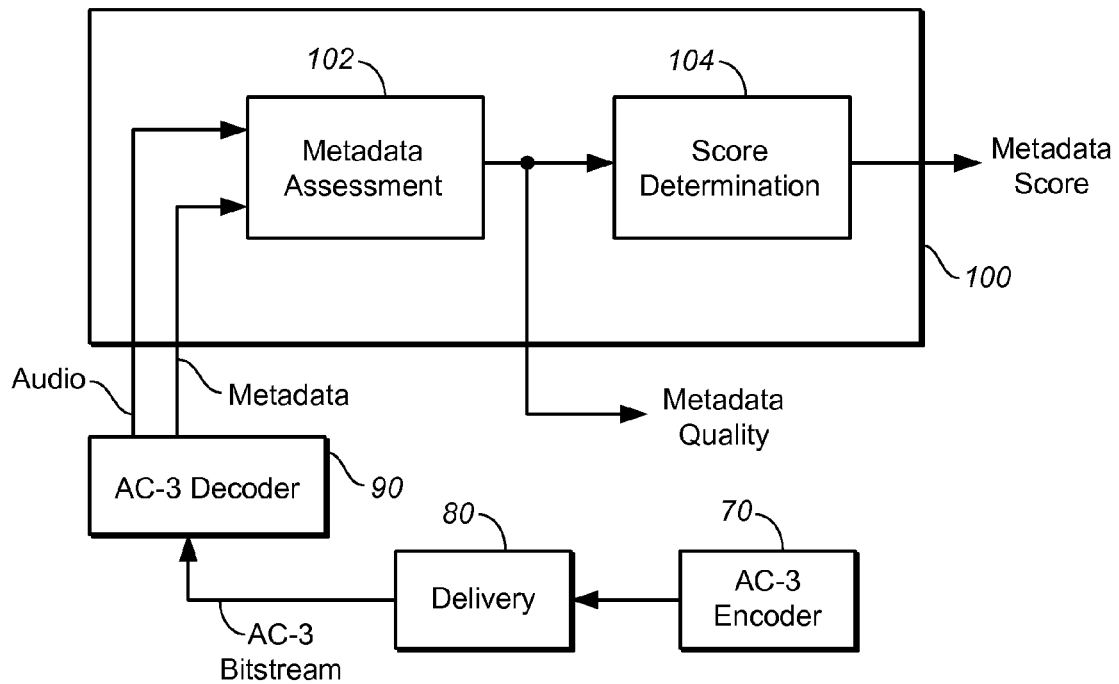
FIG. 1 is a block diagram of an embodiment of a system configured to perform an embodiment of the inventive method.

A first embodiment of a system configured to implement the inventive method will be described with reference to FIG. 1. The system of FIG. 1 includes AC-3 encoder 70, encoded audio delivery subsystem 80 (which stores and/or delivers the encoded output of encoder 70, AC-3 decoder 90, and processor 100. The encoded audio bitstream output from encoder 70 may be stored by subsystem 80 (e.g., in the form of a DVD or Blu ray disc), or transmitted by subsystem 80 (which may implement a transmission link or network), or may be both stored and transmitted by subsystem 80.

Processor 100 is configured to perform an embodiment of the inventive method, and includes metadata assessment stage 102 and metadata score determination stage 104. Stage 102 is configured to assess at least two metadata parameters associated with an audio bitstream (i.e., the encoded audio bitstream asserted to the input of decoder 90), and to determine individual metadata parameter quality values, each of the individual metadata parameter quality values indicative of quality (e.g., correctness) of a different one of the assessed metadata parameters. Stage 104 is configured to generate data indicative of a metadata score, where the metadata score is a value determined by a combination (e.g., a linear combination or other weighted combination) of the individual metadata parameter quality values determined by stage 102. The metadata score is indicative of overall quality (e.g., correctness) of the assessed metadata parameters.

For example, when the encoded bitstream asserted to the input of decoder 90 is a Dolby Digital (AC-3) or Dolby E encoded bitstream, the output of decoder 90 would comprise metadata parameters and PCM audio data. The metadata parameters, extracted by decoder 90 from the decoded bitstream and asserted to stage 102 (with the decoded audio content of the encoded bitstream), would typically include the DIALNORM, COMPR, DYNRNG, CLEV, CMIXLEV, SLEV, SURMIXLEV, MIXLEVEL and MIXLEVEL2, ACMOD, and BSMOD metadata parameters. In a typical implementation, metadata assessment stage 102 is configured to implement a dialog level measuring function (to measure the mean level of dialog occurring the audio program determined by the decoded audio content), and to assess the degree to which the DIALNORM parameter correctly indicates the mean level of the dialog (e.g., the ratio of the measured mean dialog level to the level indicated by the DIALNORM parameter), or more simply, to assess whether or not the DIALNORM parameter correctly indicates the mean level of the dialog). Stage 102 generates a DIALNORM metadata parameter quality value indicative of result of this assessment. In the typical implementation, metadata assessment stage 102 is also configured to determine which of the channels of the audio content (received from decoder 90) is a "silent" channel (in the sense that its level is less than a predetermined threshold level), and to assess the degree to which the ACMOD parameter correctly indicates the number of audio channels, or to assess otherwise whether or not the ACMOD parameter correctly indicates the number of audio channels. The ACMOD parameter is intended to indicate how many audio channels are actually present in the bitstream. Stage 102 may examine the content of the audio channels and determine how many of the present audio channels are active (non-silent), and hence infer the correctness of the ACMOD parameter associated with the channels. Stage 102 also generates an ACMOD metadata parameter quality value indicative of result of this assessment.

Optionally, stage 102 is also configured (e.g., programmed) to assess at least one additional one of the metadata parameters of the decoded audio bitstream (e.g., all the metadata parameters, other than the ACMOD and DIALNORM parameters, of the complete set of metadata parameters of the decoded audio bitstream), and to determine an individual metadata parameter quality value for each assessed additional one of the metadata parameters, such that each of the individual metadata parameter quality values is indicative of quality (e.g., correctness) of a different one of the assessed additional metadata parameter(s).

Signals indicative of the determined individual metadata parameter quality values are asserted from stage 102 to metadata score determination stage 104. For example, a DIALNORM metadata parameter quality value (e.g., having the value "1") and an ACMOD metadata parameter quality value (e.g., having the value "0") could be asserted from stage 102 to stage 104. Stage 104 is configured to generate data indicative of a metadata score, in response to the individual metadata parameter quality values. For example, stage 104 may be configured to assign a weight to each of the individual metadata parameter quality values, such that the quality value(s) for metadata parameter(s) deemed (e.g., predetermined) to have relatively great importance are assigned relatively large weight(s), and the quality value(s) for metadata parameter(s) deemed to have relatively low importance are assigned relative small weight(s). Stage 104 is typically configured to generate the metadata score to be a value determined by a predetermined combination (e.g., sum or product) of the individual weighted metadata parameter quality values, so that the metadata score is indicative of the overall quality (e.g., correctness) of the individual metadata parameters assessed by stage 102. The weights may be chosen so that the metadata score is a number (e.g., an integer) within a small integer range (e.g., the range from 1 through 5). In some other embodiments, the weights are chosen so that the metadata score is a non-integer number (e.g., 2.3, 4.4, or 3.282693) within a predetermined range (e.g., the range from 1 through 5 or another small range). One exemplary method for determining the metadata score is to determine a preliminary score which is a value determined by a combination (e.g., sum or product) of the individual weighted metadata parameter quality values, and to round the preliminary score to the nearest integer value to determine the metadata score.

Stage 104 may be configured to weight each of the individual metadata parameter quality values determined by stage 102 to generate weighted quality values, and to sum the weighted quality values to generate the metadata score. The weights may be chosen so that the metadata score is a number (e.g., an integer or a non-integer number) within a small range (e.g., the range from 1 through 5).

The output of the FIG. 1 system is a signal ("Metadata Score") asserted at the output of stage 104, indicative of the metadata score determined by stage 104, and a signal ("Metadata Quality") asserted at the output of stage 102, indicative of the individual metadata parameter quality values determined by stage 102.

By performing the metadata assessment repeatedly to assess a sequence of combinations of metadata parameter values of an audio bitstream (e.g., in real-time, continuously), processor 100 could generate an output signal indicative of a sequence of sets of individual metadata parameter quality values (determined by stage 102) and an output signal indicative of a sequence of metadata scores (determined by stage 104) for the audio bitstream. In general, the metadata score for an audio bitstream can change over time, and it may be useful to monitor such changes.

If the inventive method is operating on a continuous bitstream, rather than a finite length bitstream, dialog loudness measurement (and each other measurement performed to assess quality of an individual metadata parameter) may be continuously updated and may represent the level of the dialog, for example, for only the last few seconds of the bitstream. If the method is operating on a pre-stored, finite length bitstream (such as an audio file stored on a hard disk), then the entire program may be analyzed (e.g., in stage 102) and a single DIALNORM quality value (and a single individual metadata parameter quality value for each other assessed metadata parameter), and a single metadata score, computed for the entire bitstream.

Useful tools (e.g., the Dolby LM100 loudness meter) exist for measuring the level of dialog in audio content conveniently and easily. Stage 102 can be implemented to include (or to perform the functions of) such a tool to measure the mean dialog loudness of audio content of an audio bitstream (e.g., a decoded AC-3 bitstream asserted to stage 102 from decoder 90). The audio content of a decoded AC-3 bitstream is PCM data. Decoder 90 would output such PCM data in response to encoded (compressed) audio included in the AC-3 bitstream asserted from delivery subsystem 80 to decoder 90. In a typical implementation, stage 102 is configured to generate a metadata quality value indicative of whether the DIALNORM value of a decoded AC-3 bitstream (output from decoder 90) has been set correctly and matches the true mean dialog loudness value of the audio. Such metadata quality value (and each other individual metadata quality value determined by stage 102) would be asserted to stage 104, for use by stage 104 to generate data indicative of the metadata score for the AC-3 bitstream.

In a class of embodiments, the invention is a method for analyzing metadata associated with (e.g., included in) an audio signal and computing a metric (a "metadata score") indicative of overall quality (e.g., accuracy) of at least two metadata parameters associated with the audio signal. For example, the overall metric could be calculated by computing metrics for each of a number of metadata parameters separately, and then computing a weighted average of the individual metrics. Typically, the weights would be determined based on the relative importance of the individual metadata parameters that are assessed. Examples of metadata parameters in a Dolby Digital (or Dolby E, or Dolby Digital Plus) audio bitstream whose overall quality could be indicated by the metadata score are DIALNORM, COMPR, DYNRNG, mixing levels, etc.

In a class of embodiments, the inventive method including the steps of: (a) delivering an audio bitstream through a broadcast chain (e.g., including encoder 70 and delivery subsystem 80 of FIG. 1), said audio bitstream including a set of metadata parameters; (b) at least one stage of the broadcast chain (e.g., the output of delivery subsystem 80 of FIG. 1, and/or a stage within subsystem 80), assessing at least two of the metadata parameters; and (c) determining individual metadata parameter quality values, each of the individual metadata parameter quality values indicative of quality of a different one of the at least two metadata parameters assessed in step (b), and generating data indicative of a metadata score, where the metadata score is a value determined by a weighted combination of the individual metadata parameter quality values, and said metadata score is indicative of overall quality of the at least two metadata parameters assessed in step (b).

In general, various embodiments of the inventive method can be implemented at one or more stages of a broadcast chain to assess (and, if necessary, facilitate correction of) the metadata associated with a particular audio signal. For example, audio signals with "good" metadata quality (e.g., as indicated by a metadata score greater than a predetermined threshold value, e.g., the value "3" where the range of the score is from 1 through 5) could be passed unmodified to subsequent stages of the chain. Signals with "poor" metadata quality (e.g., as indicated by a metadata score less than or equal to the predetermined threshold value) could be corrected prior to being passed to subsequent stages of the chain. Alternatively, signals with "poor" metadata quality could be passed unmodified to, but flagged for correction at, a subsequent stage of the chain.

As a specific example of implementation of the inventive method, consider a Dolby Digital stream created by a licensed encoder, which is determined to include "good" quality metadata (i.e., to have a good metadata score) at a first stage of a broadcast chain. Assume that, at a subsequent stage of the broadcast chain, the DIALNORM metadata parameter and associated compression metadata parameters are modified in order to raise playback loudness. At a final stage in the chain, the metadata quality is assessed in accordance with an embodiment of the invention, and determined to have a "poor" metadata score. In response to the "poor" metadata score, the DIALNORM parameter could be corrected (e.g., by a Dolby DP600 program optimizer device) so as to cause the playback loudness to be returned to the appropriate level.

If stage 102 is implemented to measure the true mean dialog loudness of audio data (e.g., audio content of a decoded AC-3 bitstream output from decoder 90), the measurement may include a step of isolating segments of the audio content that predominantly contain speech. Such a method is described in U.S. patent application Ser. No. 10/233,073, by Vinton, et. al., entitled "Controlling Loudness of Speech in Signals That Contain Speech and Other Types of Audio Information," published March 4, as US2004/0044525 A1. Alternatively, other isolation methods may be used. The audio segments that predominantly are speech are then processed in accordance with a loudness measurement algorithm. For audio data decoded from an AC-3 bitstream, this algorithm may be a standard K-weighted loudness measure (in accordance with the international standard ITU-R BS.1770). Alternatively, other loudness measures may be used (e.g., those based on psychoacoustic models of loudness).

The isolation of speech segments is not essential to measure the mean dialog loudness of audio data. However, it improves the accuracy of the measure and typically provides more satisfactory results from a listener's perspective. Because not all audio content contains speech, the loudness measure of the whole audio content may provide a sufficient approximation of the dialog level of the audio, had speech been present.

Figure 2:
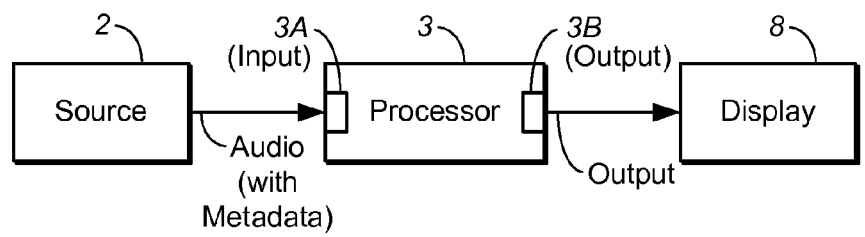
FIG. 2 is a block diagram of another embodiment of the inventive system.

FIG. 2 is a block diagram of another embodiment of the inventive system. The system of FIG. 2 includes audio bitstream source 2, processor 3, and display device 8 configured to display images indicative of the output of processor 3. Processor 3 is coupled to receive an audio bitstream (including audio content and metadata parameters to be assessed) from source 2. The audio bitstream may be an encoded (e.g., compressed) or non-encoded bitstream.

Processor 3 includes at least one input 3A coupled to receive the input bitstream from source 2, at least one output 3B, and a processing subsystem (which may be all of processor 3 other than input 3A and output 3B) coupled between input 3A and output 3B and configured (e.g., programmed) to perform required processing on the input bitstream (including any required decoding and extraction of decoded metadata and decoded audio) in accordance with an embodiment of the inventive method to generate output data indicative of a metadata score (and optionally also indicative of individual metadata parameter quality values). A signal indicative of the output data is asserted at output 3B, for driving the pixels of the display screen of device 8. A user viewing the display produced by device 8 in response to the output signal can learn the metadata score, and optionally also the individual metadata parameter quality values, determined in accordance with the invention by processor 3. Processor 3 may be a general purpose processor (programmed to perform an embodiment of the inventive method), or a digital signal processor (programmed and/or otherwise configured to perform an embodiment of the inventive method), or a microprocessor or other processor (programmed and/or otherwise configured to perform an embodiment of the inventive method).

The invention may be implemented in hardware, firmware, or software, or a combination of both (e.g., as a programmable logic array). Unless otherwise specified, the algorithms or processes included as part of the invention are not inherently related to any particular computer or other apparatus. In particular, various general-purpose machines may be used with programs written in accordance with the teachings herein, or it may be more convenient to construct more specialized apparatus (e.g., integrated circuits) to perform the required method steps. Thus, the invention may be implemented in one or more computer programs executing on one or more programmable computer systems (e.g., an implementation of processor 3 of FIG. 2 or processor 100 of FIG. 1) each comprising at least one processor (e.g., an implementation of processor 100 of FIG. 1), at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

For example, when implemented by computer software instruction sequences, various functions and steps of embodiments of the invention may be implemented by multithreaded software instruction sequences running in suitable digital signal processing hardware, in which case the various devices, steps, and functions of the embodiments may correspond to portions of the software instructions.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be implemented as a computer-readable storage medium, configured with (i.e., storing) a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. Numerous modifications and variations of the present invention are possible in light of the above teachings. It is to be understood that within the scope of the appended claims, the invention may be practiced otherwise than as specifically described herein.

What is claimed is:

1. A method, comprising the steps of:
receiving an audio bitstream including at least two metadata parameters,
assessing the at least two metadata parameters, including by
determining metadata parameter quality values, including a metadata parameter quality value for each of the at least two metadata parameters, wherein the audio bitstream is indicative of audio content of a program, the metadata parameters are indicative of at least one of playback level, playback dynamic range, mixing level, or channel configuration of the audio content, and at least one of the metadata parameters is specifically intended for use in changing sound of the program as delivered to a listening environment, and each said metadata parameter quality value indicates whether or not the respective metadata parameter:
has been set correctly by a content creator, or
has been generated correctly during an encoding of the audio bitstream, and has not changed during a distribution and a transmission of the audio bitstream; and
generating a metadata score based on a combination of the metadata parameter quality values, wherein at least two of the metadata parameter quality values on which the metadata score is based correspond to the same segment of the audio bitstream.

2. The method of claim 1, wherein the metadata score is a value determined by a linear combination of the individual metadata parameter quality values, wherein generating the metadata score includes a step of weighting each of the metadata parameter quality values to generate weighted quality values, and summing up the weighted quality values to generate the metadata score.

3. The method of claim 1, wherein the metadata score is a value determined by a weighted combination of the metadata parameter quality values, wherein generating the metadata score includes a step of weighting each of the metadata parameter quality values to generate weighted quality values, and combining the weighted quality values to generate the metadata score.

4. The method of claim 1, wherein the metadata score is a number within a range from one through five.

5. The method of claim 1, wherein the audio bitstream is one of an AC-3 bitstream, a Dolby Digital Plus bitstream, or a Dolby E bitstream.

6. The method of claim 5, wherein one of the assessed metadata parameters is a DIALNORM metadata parameter associated with a mean level of a dialog.

7. The method of claim 5, wherein the assessed metadata parameters include a DIALNORM metadata parameter and an ACMOD parameter.

8. The method of claim 1, wherein the audio bitstream is associated with the complete set of assessed metadata parameters.

9. The method of claim 1, wherein
the audio bitstream is delivered through a broadcast chain; and
the quality values and the metadata score are determined at at least one stage of the broadcast chain.

10. A system for assessing at least two metadata parameters included in an audio bitstream, wherein the audio bitstream is indicative of audio content of a program, the metadata parameters are indicative of at least one of playback level, playback dynamic range, mixing level, or channel configuration of the audio content, and at least one of the metadata parameters is specifically intended for use in changing sound of the program as delivered to a listening environment, the system comprising:
at least one input unit for receiving the audio bitstream; and
a subsystem coupled to the at least one input unit and configured to assess at least two of the metadata parameters and including
a calculation unit for determining metadata parameter quality values, including a metadata parameter quality value for each of the at least two metadata parameters, and for determining a metadata score, wherein the metadata parameter quality values indicate whether or not the respective metadata parameters:
have been set correctly by a content creator, or
have been generated correctly during an encoding of the audio bitstream, and
have not changed during a distribution and a transmission of the audio bitstream; wherein
the calculation unit is configured to calculate the metadata score based on a combination of the metadata parameter quality values, and at least two of the metadata parameter quality values on which the metadata score is based correspond to the same segment of the audio bitstream.

11. The system of claim 10, wherein the metadata score is a value determined by a linear combination of the metadata parameter quality values, and the subsystem is configured to weight each of the individual metadata parameter quality values to generate weighted quality values, and to sum the weighted quality values to generate the metadata score.

12. The system of claim 10, wherein the metadata score is value determined by a weighted combination of the metadata parameter quality values, and the subsystem is configured to weight each of the individual metadata parameter quality values to generate weighted quality values, and to combine the weighted quality values to generate the metadata score.

13. The system of claim 10, wherein the metadata score is a number within a range from one through five.

14. The system of claim 10, wherein the audio bitstream is one of an AC-3 bitstream, a Dolby Digital Plus bitstream, or a Dolby E bitstream, and one of the metadata parameter quality values is indicative of a quality of a DIALNORM metadata parameter, the DIALNORM metadata parameter associated with a mean level of a dialog.

15. The system of claim 14, wherein the assessed metadata parameter quality value is indicative of a quality of the DIALNORM metadata parameter, and another one of the metadata parameter quality values is indicative of a quality of an ACMOD metadata parameter.

* * * * *